United States Patent [19]

Johnsen et al.

[11] Patent Number: 4,684,411

[45] Date of Patent: Aug. 4, 1987

[54] METHOD FOR FINISHING STEEL SHAPES WITH MAGNETITE AND PRODUCT OBTAINED THEREFROM

[76] Inventors: Hawk Johnsen, 2313 Lakeshore Blvd. West, Apt. 913, Toronto, Ontario, Canada, M8V 1A8; Kaare Johnsen, 1360 Whiteoaks Blvd., Apt. 1108, Oakville, Ontario, Canada, L6H 2R7

[21] Appl. No.: 799,137

[22] Filed: Nov. 18, 1985

[30] Foreign Application Priority Data

Nov. 21, 1984 [CA] Canada ..................................... 468342

[51] Int. Cl.$^4$ ........................... B08B 1/02; B08B 7/00; B08B 30/00; C03C 23/00
[52] U.S. Cl. .......................................... 134/15; 134/2; 134/19; 134/29; 134/30; 148/16; 148/16.6
[58] Field of Search ..................... 148/16, 16.6; 134/2, 134/15, 19, 29, 30

[56] References Cited

U.S. PATENT DOCUMENTS

| | | | |
|---|---|---|---|
| 1,144,884 | 6/1915 | White ..................... | 148/16 |
| 3,067,069 | 12/1962 | Stack ..................... | 134/30 X |
| 3,076,730 | 2/1963 | Nolte ..................... | 134/30 X |
| 4,064,884 | 12/1977 | Asp ..................... | 134/15 |
| 4,201,600 | 5/1980 | Luten et al. ..................... | 148/16.6 X |

FOREIGN PATENT DOCUMENTS 687725  2/1953  United Kingdom ................. 148/16

*Primary Examiner*—Andrew H. Metz
*Assistant Examiner*—William G. Wright
*Attorney, Agent, or Firm*—Ridout & Maybee

[57] ABSTRACT

A method is described for oxidatively treating the outer surface of a steel shape such as welding wire which comprises, cleaning the surface and subjecting the cleaned surface to a heated atmosphere of air or a gas mixture containing more oxygen than normally found in air. The atmosphere is heated to a range of about 300° C. to about 800° C., and the surface is removed from the heated atmosphere upon oxidation of the surface to a depth of about 0.5 to about 2.5 microns. The resulting welding wire may be used to provide rates of deposition significantly greater than heretofore possible with conventional wire.

16 Claims, No Drawings

METHOD FOR FINISHING STEEL SHAPES WITH MAGNETITE AND PRODUCT OBTAINED THEREFROM

This invention relates to a method for treating the outer surface of a steel shape to impart an oxide layer thereto and to the product obtained from such method. The words "steel shape" are used in this specification to mean any useful metal shape formed from steel, and include, for example, steel wires, bars, rods, sheets, and tubes. The word "steel" is used in its common sense in this specification to mean alloys of iron and carbon, with or without other elements, in which the carbon content does not exceed about 1.7%, but does not include higher alloy steels whose properties mainly are attributable to the presence of one or more elements other than carbon.

Protective coatings are commonly applied to steel shapes to retard rust. When the steel shape is to be subsequently processed, chemical coatings or platings thereof are often impractical. This is particularly so when the steel shape is welding wire, such as is used for the electrode in metal inert gas (MIG) arc welding or to form the core of welding rods used in stickelectrode arc welding. The coating or a plating of the wire used in such applications could add undesired characteristics to the weld deposit formed during the welding process.

The invention disclosed herein relates to a method for treating the outer surface of a steel shape to impart thereto a surface finish of one or more oxide of iron and to the product obtained therefrom. The oxide finish of the invention provides the finished steel shape with a degree of rust resistance so it is generally not necessary to apply chemical coatings, plating or lubricants to the steel shape to prevent rapid rusting. It is thought that the oxide finish provided in accordance with the invention comprises magnetite, but since the oxide layer formed by the process of the invention is very thin, a positive characterization of it is difficult. Therefore, the specific chemical characterization of the oxide finish of the invention is not known.

One of the concerns in electric arc welding is to maintain the stability of the arc thereby avoiding spattering and a rough deposit of weldment. As arc stability decreases with increasing voltage and amperage input it is necessary to limit the energy input to the arc electrode, and this, correspondingly, limits the rate of deposition of weldment.

A surface treatment of the steel wire electrode in accordance with the invention stabilizes the electric arc which has the advantage that higher energy inputs can be used without experiencing these undesirable effects. Thus, when the steel electrode is finished according to the invention, a higher deposition rate is attainable.

The stabilizing effect of the surface treatment of the invention is believed to take effect in the following manner. The surface oxide layer decomposes at a higher temperature than the melting point of the steel electrode itself, so that when the inner core of the electrode melts, the surface tension in the as yet unmelted surface finish causes a constriction in the diameter of the arc resulting in the energy of the arc becoming more concentrated.

In addition to this "pinch effect", the surface finish also releases oxygen from the decomposition of the oxide layer into the arc which helps to stabilize the arc, thereby preventing the violent and erratic behaviour of the arc which is so undesirable. Use of steel wire electrode of the invention greatly reduces spatter of the weld metal and results in a smoother and cleaner deposit of weldment. Since the arc is stabilized, it is possible to increase the energy input to the arc, i.e. both amperage and voltage, which results in a faster deposition rate of filler metal in the weld.

During arc welding, nitrogen gas from the air will, unless excluded, mix with the weld material to produce porosity in the welding area. Consequently, a displacing gas is used in MIG arc welding to remove nitrogen from the vicinity of the arc. Common displacing gases are: (1) carbon dioxide; (2) argon mixed with 2%–5% oxygen; (3) argon mixed with 12%–25% carbon dioxide; and (4) argon mixed with carbon dioxide and oxygen. Argon is a relatively expensive gas, so that the first alternative is preferable from an economic standpoint. However, use of pure carbon dioxide displacing gas does not allow high voltages and amperages to be used with a solid mild steel welding wire. An oxide surface finish on the welding wire in accordance with the invention allows a higher voltage and amperage to be used with carbon dioxide shielding gas, thus giving better deposition rates.

These and further objects, advantages and features of the invention will be apparent to those of ordinary skill in the art from the detailed description of the invention which follows.

A method according to the invention for treating the outer surface of a steel shape to impart thereto an oxide surface finish comprises: cleaning the surface; subjecting the cleaned surface to a heated atmosphere having at least the oxygen content of air, said atmosphere being heated to a range of about 300° C. to about 800° C.; and removing the cleaned surface from said heated atmosphere upon oxidation of the surface to a depth of about 0.5 to about 2.5 microns. The metal shape preferably is cooled in a liquid bath or by passage under liquid spray nozzles and thoroughly dried.

The improved product obtained from the process of the invention is a steel shape comprising an inner core of steel and an outer oxide surface finish overlying the core, the surface finish being applied in accordance with the method of the invention. Surface treated steel wire used for welding applications is an especially important and useful embodiment of the invention.

The process of the invention will now be more particularly described, by way of example, with reference to welding wire as the preferred steel shape. The term "welding wire" is understood by those in the welding art to be a steel wire commonly having a diameter of between about 0.5 mm and about 3.2 mm, which wire is used as the steel electrode in MIG welding or the like. It may also be cut into standard lengths and coated with various known flux materials to form arc welding rods, such as are used in stick-electrode arc welding. In this latter case, the appropriate flux material is, according to the invention, applied to the welding rod over the surface oxide finish of the invention.

With welding wire as the preferred starting material, the average thickness of the oxide finish necessary to obtain significant increases in the rate of deposition of weldment is about 0.5–2.5 microns, with an optimum thickness of approximately 1.0–2.0 microns. To obtain a uniform oxide finish in this range of thicknesses, it is necessary that all surface irregularities larger than the desired thickness of the finish be removed from the outer surface of the welding wire. For this reason, it is preferable to use polished welding wire as the starting material. If, however, a thicker oxide finish is desired, for example, where the finish is required for its rust resistant properties, then it is possible to obtain satisfactory results starting with an unpolished steel shape having a rougher outer surface, so long as the irregularities on the surface are significantly smaller than the desired thickness of the oxide coating.

Contaminants such as drawing lubricants, grease, or other chemicals on the surface of the steel shape may entirely inhibit formation of the oxide finish. Accordingly, a thorough cleaning step is required if satisfactory results are to be achieved.

A preferred method of removing all of such foreign materials from the outer surface of the welding wire includes the following substeps:
 (i) subjecting the welding wire to high pressure water jets;
 (ii) submerging the welding wire in a detergent solution;
 (iii) rinsing the welding wire with water; and
 (iv) drying the welding wire.

The high pressure water jets of sub-step (i) shake and vibrate the welding wire and thereby cause the removal of most particulate foreign materials from the surface of the wire. There are various water jet machines on the market which will satisfactorily perform this function, but the applicant prefers the PARORBITAL TM water jet cleaner produced by Weldman Industries, of England and the United States. The detergent into which the shape is submerged during step (ii) may be any common water-based industrial detergent. The water rinsing step (iii) may be by means of a bath or by means of spray nozzles. The drying of step (iv) may also take a variety of known forms, with hot air jet drying being preferred.

Once all foreign materials are removed from the outer surface of the welding wire, the wire is subjected to an atmosphere having at least about the oxygen content of air where the wire is heated from between about 300° C. and about 800° C. The heating of the wire may be accomplished by any of the following methods: electrical resistance heating; electrical induction heating; convection heating, or flame heating. In the case of electrical resistance heating, the electric current is run through the welding wire itself so as to heat the wire to the required temperature.

The preferred method of heating is convection heating as it is clean, fast, repeatable and lends itself to automatic cycling. Moreover, convection heating is especially suited for even heating of steel shapes of irregular and circular cross-sections.

After the heating step, the welding wire is cooled at a controlled rate which determines the final hardness of the wire. This cooling may take place by submerging the shape in a liquid bath, such as water, by spraying a coolant liquid on the wire, or by utilizing a coolant gas such as air emitted from jets.

The duration of the heating step may be reduced by increasing the amount of oxygen available in the atmosphere for bonding with the surface of the steel shape. Consequently, the atmosphere, while it may simply consist of air, may be enriched with quantities of oxygen gas or consist of substantially pure oxygen. Moreover, where exceedingly short heating times are required, it may be desirable to further enrich any of the above atmospheres with highly reactive ozone gas.

The process may be carried out on a batch basis, or more usefully, on a continuous basis. In such continuous finishing of welding wire, the wire continuously travels in its axial direction through a heating zone, wherein it is also immersed in said atmosphere. In this case, the heating of the wire is applied at a controlled rate and the duration of the heating is controllable, allowing for various speeds of wire travel. Moreover, the selected temperature of heating is dependant upon the diameter of the wire being finished and the physical characteristics required, including the thickness of the oxide finish desired. These parameters may be readily determined by means of routine experiments and calculations. It is also similarly easy to modify the cleaning step and final cooling so as to provide for a continuous process.

A preferred set of oxidizing conditions is obtained by subjecting the welding wire to air heated to about 500° C. in an oven. The oven is about one meter long and the wire is passed therethrough at a rate of about 7 meters/second. This provides the desired surface oxidation to a depth of about 1-2 microns.

Of course, the temperature, time and oxygen concentration variables may be altered in any of a wide variety of ways to give the surface finish of the invention. Clearly, it is preferred to move the welding wire or other steel shape through the heating zone as quickly as possible while still obtaining the desired surface finish. Thus, a rate of steel wire movement of 20 m/sec. through a heating zone of up to about 5 meters long having an atmosphere with an oxygen content greater than that for air may prove to be the most preferred conditions from a commercial point of view.

An appreciation of the superior welding characteristics provided by welding wire treated in accordance with the invention may be obtained by reference to the following examples.

EXAMPLE 1

Comparative MIG welding trials were conducted using a 0.9 mm diameter solid welding wire and a 1.2 mm diameter welding wire (S6HM) both having an oxide finish according to the invention, and a commercially available standard North American copperless (non-coppered or brite) wire (NS115).

These welding trials were conducted using a Hobart Mega MIG TM 450 RVS welder. A GULLCO KAT TM Model GK171-90 tractor was used for controlling the travel rate of the torch during set-up of optimum conditions for producing a ¼" fillet weld. On the basis of the established condition for each wire and shielding gas combination, a ¾" flat position butt weld coupon was prepared for each of NS115 with $CO_2$ shielding gas, NS115 with Argon/$CO_2$ shielding gas, S6HM with $CO_2$ shielding gas and S6HM (1.2 mm diameter) with $CO_2$ shielding gas.

The conditions used for the preparation of each weld coupon are shown in Table 1 below.

TABLE 1

| | | CONDITIONS OF WELDING TRIALS | | | | | | |
|---|---|---|---|---|---|---|---|---|
| Conditions Trial No. | Wire | Shielding Gas | Amps | Volts | Gas Flow (1 pm.) | Wire Feed Cm/Min (in/min) | Power Meter Reading (Amps) | Tractor Speed Cm/min (in/min) |
| | NS115 (0.9 mm) | $CO_2$ | 210 | 34 | 30 | 1428 (562) | 210 | 44 (17.3) |

TABLE 1-continued

| | | CONDITIONS OF WELDING TRIALS | | | | | | |
|---|---|---|---|---|---|---|---|---|
| Conditions Trial No. | Wire | Shielding Gas | Amps | Volts | Gas Flow (1 pm.) | Wire Feed Cm/Min (in/min) | Power Meter Reading (Amps) | Tractor Speed Cm/min (in/min) |
| 2 | NS115 (0.9 mm) | Blue Shield #8 | 240 | 31 | 30 | 1716 (676) | 230 | 52 (20.2) |
| 3 | S6HM (0.9 mm) | $CO_2$ | 260 | 38 | 30 | 2272 (895)[2] | 260 | 60 (24) |
| 4 | S6HM (1.2 mm) | $CO_2$ | 380 | 42[3] | 30 | 1516 (597) | 380 | — |

Notes:
[1]Welds made on ¾" plate prepared Vee with backing plate. Preheated to 300° F. with 300° F. interpass temperature maintained.
[2]Maximum wire feed capability of equipment.
[3]Maximum for equipment.

As shown in Table 2 below, significantly different welding characteristics were obtained by using S6HM wire.

TABLE 2

| | Results of Welding Trials | |
|---|---|---|
| Welding Trial | Deposition Rate (kg/hr) | Power Usage (kj/kg) |
| #1 - NS/$CO_2$ | 4.1 | 6294 |
| #2 - NS/Ar/$CO_2$ | 4.9 | 5468 |
| #3 - S6HM/$CO_2$ | 6.6 | 5405 |
| #4 - S6HM (1.2 mm)/$CO_2$ | 8.0 | 7199 |

Acceptable levels of splatter and undercut were observed on the fillet welds in all conditions chosen for the preparation of weld coupons.

Much greater deposition rates with $CO_2$ shielding gas were found to be achievable with the S6HM wire of the invention. The properties of the deposited weld metal met the CSA W48.4-M1980 class ER.480S-6 (Canada) and ANSI/AWS A5.18-79 ER 70S-6 (United States) requirements in all cases. The ultimate deposition rate for S6HM 0.9 mm wire with $CO_2$ may not have been achieved because the maximum wire feed speed of the equipment was used for welding trial #3 in this program. Similarly, a welding machine capable of higher voltage would be required to establish optimum deposition conditions for S6HM 1.2 mm wire used in welding trial #4.

A welding cost analysis was conducted using information obtained from trials 1 and 3 above. The deposition rate using 0.9 mm S6HM wire was 1.6 times faster than the deposition rate using 0.9 mm NS115 wire. This resulted in weld time saving of 37.7% and a production time saving of 11.3%. The costs for the two methods are shown in Table 3.

TABLE 3

| | Costs per meter welded | |
|---|---|---|
| Item | NS 115 ($/m) | S6HM ($/m) |
| cost of electrode | 0.280 | 0.280 |
| cost of shielding gas | 0.057 | 0.036 |
| cost of electricity | 0.014 | 0.012 |
| cost of labour/overhead | 1.210 | 0.750 |

TABLE 3-continued

| | Costs per meter welded | |
|---|---|---|
| Item | NS 115 ($/m) | S6HM ($/m) |
| Total cost | 1.561 | 1.078 |

Thus the cost savings per meter welded using S6HM is approximately $0.48 or 31%. This translates into a savings on welding costs of approximately $4.30 per hour.

EXAMPLE 2

Comparative MIG welding trials were conducted using 1.2 mm diameter solid welding wires of the invention, S6HM and HM, a commercially available 1.2 mm diameter solid welding wire, NS-115, and a 1.6 mm diameter flux cored wire, LA-T9.

Welding trials were conducted using each wire to prepare standard CSA W48.4-M1980 and ANSI/AWS A5.18-79 weld coupons at maximum possible deposition rates.

MIG welding trials were conducted using a Hobart Mega Flex™ 650 RVS welding machine. A Gullco Kat™ (model GK171-90) was used for controlling the torch travel speed during set-up and a Hobart™ 70L wirefeeder was used to control wire feed speed. All welding tests used $CO_2$ gas shielding at a flow rate of 30 cfh.

Conditions for each wire were established using an automatic set-up and running at the maximum deposition rate possible commensurate with acceptable spatter, undercut and flatness when producing a 5/16" horizontal fillet weld. These conditions (shown in Table 4) were then used to prepare a ¾" flat position butt weld coupon (45° prepared Vee - 12 mm root gap). Welds were applied with multiple passes using a maximum interpass temperature of 350° F.

TABLE 4

| | | Conditions of Welding Trials | | | | | |
|---|---|---|---|---|---|---|---|
| Conditions Trial No. | Wire | Shielding Gas | Amps | Volts | Gas Flow cfh | Wire Feed Cm/Min (in/min) | Tractor Speed Cm/Min (in/min) |
| 1 | LA-T9 (1.6 mm) | $CO_2$ | 330 | 30 | 30 | 782 (308) | 33 (12.9) |
| 2 | NS-115 (1.2 mm) | $CO_2$ | 285 | 34 | 30 | 1158 (456) | 29 (11.3) |
| 3 | S6HM (1.2 mm) | $CO_2$ | 345 | 39 | 30 | 1478 (582) | 40 (15.6) |
| 4 | HM (1.2 mm) | $CO_2$ | 380 | 40 | 30 | 1712 (674) | 36 (14.0) |
| 5 | HM (1.2 mm) | $CO_2$ | 345 | 39 | 30 | 1478 (582) | 40 (15.7) |

*a ⅜" fillet weld was produced on this trial

The HM wire was used in trial #4 at very high amperage. These conditions were considered acceptable under automatic conditions used in preparing the fillet weld, but were found to result in burn-through when using the semiautomatic mode in preparing the butt-weld test plate. For this reason an additional trial (#5) was conducted using slightly lower amperage.

During the course of welding trials a deposition efficiency test was conducted on the LA-T9 sample. One hundred feet of LA-T9 wire was laid down on a ⅝" thick steel plate to determine the Deposition Efficiency. The results are as follows:

| Weight of plate before welding: | 8.16 kg |
|---|---|
| Weight of plate after welding: | 8.52 kg |
| Weight of deposited weld: | 0.36 kg |
| Weight of 100 feet of wire: | 0.404 kg |
| Weld Deposition Efficiency | 89% |

The weld coupons were submitted for radiographic evaluation and showed no significant inclusions or porosity. Weld metal tensile specimens were machined from coupons and tested in accordance with CSA-W484-M1980 Class E4802T-9-CH. Results are summarized as follows:

|  |  | Yield Stress (Ksi) | UTS (Ksi) | Elong. (%) |
|---|---|---|---|---|
| #1 | LA-T9 | 66.2 | 76.2 | 28.5 |
| #2 | NS-115 | 57.6 | 72.5 | 30.5 |
| #3 | S6HM | 53.9 | 74.4 | 29.0 |
| #5 | HM | 52.6 | 74.7 | 33.5 |

Examination of the welding conditions, established on the basis of maximum deposition rate with acceptable spatter and bead flatness of a 5/16" fillet weld, shows the S6HM and HM wires of the invention to be superior in deposition rate and power usage. The following comparison is made on the basis of weld trials conducted:

| Welding Wire | Current Density (AMPS/mm²) | Deposition Rate (kg/hr) | Power Usage (K Joules/kg) |
|---|---|---|---|
| LA-T9 | 271* | 4.5 | 7956* |
| NS-115 | 284 | 5.5 | 6372 |
| S6HM | 310 | 7.8 | 6264 |
| HM7 | 310 | 7.8 | 6264 |

*Based on metal cross-section of wire only.

We claim:

1. A method for oxidatively heat treating the outer surface of a steel welding wire suitable for use as an electrode in MIG of arc welding, comprising:
    cleaning the surface;
    subjecting the cleaned surface to a heated atmosphere having at least about the oxygen content of air, said atmosphere being heated to a range of about 300° C. to about 800° C.; and
    removing the cleaned surface from said heated atmosphere upon oxidation of the surface to a depth of about 0.5 to about 2.5 microns.

2. A method according to claim 1, wherein the atmosphere is air.

3. A method according to claim 2, wherein the temperature is about 500° C.

4. A method according to claim 3, further comprising a heating zone of about one meter in length through which the cleaned welding wire is passed longitudinally at a rate of about 7 meters per second.

5. A method according to claim 1, wherein the surface is treated to a depth of about 1.0 to about 2.0 microns.

6. A method according to claim 4, wherein the surface is treated to a depth of about 1.0 to about 2.0 microns.

7. A method according to claim 1, wherein the atmosphere further comprises ozone.

8. A method according to claim 1, further comprising cooling the steel shape removed from the heated atmosphere.

9. A method according to claim 8, wherein the cooling is provided by contacting the surface with water.

10. A method according to claim 8, wherein the cooling is provided by contacting the surface with a stream of coolant gas.

11. A method according to claim 10, wherein the coolant gas is air.

12. A method according to claim 1, wherein the surface is cleaned by subjecting the surface to high pressure water jets, submerging the surface in a detergent solution, rinsing the surface with water and drying the surface.

13. A method for oxidatively heat treating the outer surface of a steel welding wire suitable for use as an electrode in MIG or arc welding, comprising:
    cleaning the outer surface of the wire;
    subjecting the cleaned wire to electrical resistance heating in contact with an atmosphere having at least about the oxygen content of air, the heating being sufficient so that the outer surface reaches a temperature in the range of about 300° C. to about 800° C.; and
    terminating the resistance heating when the surface of the wire is oxidized to a depth of about 0.5 to about 2.5 microns.

14. A method according to claim 13, wherein the atmosphere is air.

15. A method according to claim 13, wherein the surface temperature reaches about 500° C.

16. A method according to claim 13, wherein the surface is oxidized to a depth of about 1.0 to about 2.0 microns.

* * * * *